United States Patent Office 3,152,005
Patented Oct. 6, 1964

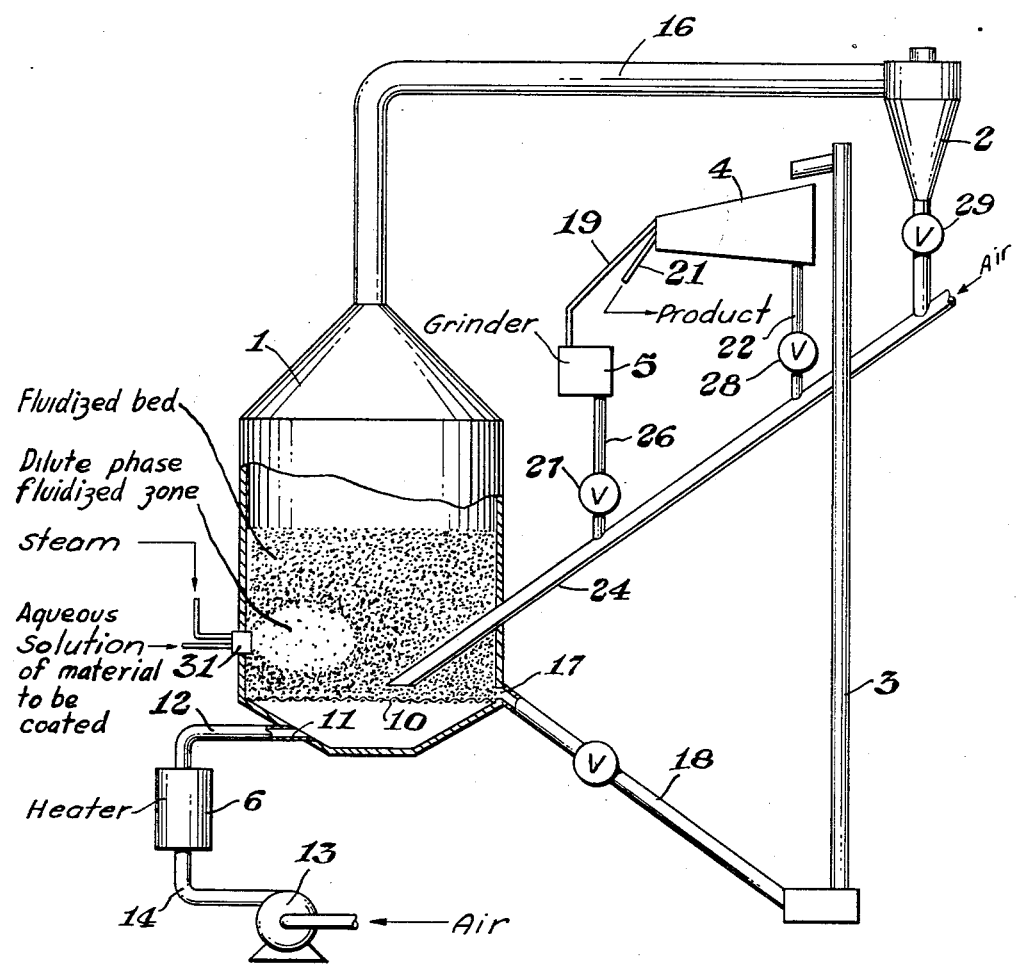

3,152,005
PROCESS FOR THE PREPARATION OF
PELLETIZED SOLIDS
Frederic C. Tuttle, Midland, Mich., assignor to The Dow Chemical Company, Midland, Mich., a corporation of Delaware
Filed Mar. 29, 1962, Ser. No. 183,639
6 Claims. (Cl. 117—100)

This invention pertains to a method for the preparation of a material in a solid particle form. More particularly, it pertains to the preparation of the solid material from an aqueous solution.

There are many materials which may more conveniently be handled in solid form and are thus prepared from aqueous solutions. For example, alkali metal pentachlorophenates are finding considerable utility as biocides. The product heretofore produced generally had a tendency to disintegrate to form dust sized particles during handling and storage due to attrition and possibly to sublimation and recrystallization of the product. Since an alkali metal pentachlorophenate is an irritating chemical, this characteristic has hindered the acceptance of this chemical. When the chemical is used as a biocide, individuals are required to handle the product under varying conditions such that special equipment cannot be used to minimize or remove the irritating dust as would be possible in an industrial plant where the product is used only as a reactant. Thus, an alkali metal pentachlorophenate product in solid form which will not disintegrate readily on handling or in storage is greatly desired.

Spray drying and fluid bed evaporators are known. However, a satisfactory product has not been produced heretofore by these methods. By spray drying techniques, fragile, spherical shell type particles are obtained which very readily disintegrate. By the usual fluid bed evaporator techniques with these materials, a product of very fine particle size, an agglomerate of fine particles, or one of irregular particles having a rough surface with irregular projections is obtained. These products readily form dust size particles, especially pentachlorophenates.

It is therefore an object of this invention to provide a process for the preparation of solid particles from an aqueous solution. It is a further object to provide a process for the preparation from aqueous solutions, solid particles of substantially spherical shape having a size of from 4 to 100 Tyler mesh. A still further object is to provide a process for the preparation of a product of sodium pentachlorophenate of solid spherical shape having a size of from 4 to 100 Tyler mesh and which may be easily handled.

The above and other objects are attained according to the invention by fluidizing a bed of solid particles of the particular material to be prepared having an average size in the range of from 4 to 100 Tyler mesh with heated air, injecting steam into the fluidized bed from the outer periphery of the bed from at least one point transversely to the fluidizing air flow at a pressure sufficient to obtain a zone of dilute fluidization within the fluidized bed from each point of injection extending to not more than ⅓ the distance across the bed, each of said dilute fluidization zones being separate and non-overlapping and entirely within the fluidized bed. An aqueous solution of the particular material is sprayed into the dilute fluidization zones, thereby coating the particles of the material as they pass through the zone. Particles of the material of a size smaller than the average size of the particles present in the fluidized bed are injected downwardly and transversely to the fluidizing air flow in the bed at a point below the dilute fluidization zones formed by the injection of the steam. By the above process, substantially spherical particles of the particular material are obtained which are hard solid particles of high density. These particles resist attrition on handling.

The invention may be more clearly understood when considered in conjunction with the attached drawing which schematically illustrates an apparatus in which the process of the invention may be carried out.

As shown in the attached drawing a vessel 1 having a confined zone is assembled wth a cyclone 2, an elevator 3, screen assembly 4, a grinder 5, and a heater 6. As shown in the drawing vessel 1 is a cylindrical vessel having a screen or perforated plate 10 located near the bottom. Below the screen or perforated plate an air inlet 11 is provided which is attached to one end of heater 6 by line 12. By means of a blower 13 and line 14 air can be blown through heater 6 and into the bottom of vessel 1 through line 12. At the top of the vessel a gas outlet is provided which is connected by means of line 16 to a cyclone 2 or some other dust collecting apparatus. A product outlet 17 is provided near the bottom of vessel 1 above the screen through which product by means of line 18 may be discharged to elevator 3. The elevator discharges into screen assembly 4 where size separations can be made. The screen assembly, as shown, is equipped with three outlets, an outlet for oversized particles connected to grinder 5 by line 19, a product outlet attached to line 21, and a fines outlet attached to line 22.

Vessel 1 is provided with a product inlet line 24 which extends into the vessel at an angle from the horizontal plane to discharge downwardly above the screen or perforated plate 10 near the center of the vessel. Means for air flow within line 24 is provided. The fine solid particles recovered in the cyclone 2 are discharged in line 24 as well as the fine particles from screen assembly 4 and the discharge from grinder 5 through line 26. Air locks 27, 28 and 29, respectively, are provided in lines 22 and 26 and from the cyclone to keep the air in line 24 from discharging into the respective equipment.

Around the periphery of vessel 1 means are provided for the injection of steam and the solution. As shown in the drawing a bifluid nozzle 31 is positioned to discharge into the vessel along a horizontal plane. A number of such nozzles may be used, however, in the drawing only one is shown.

In the operation of the apparatus, particles of alkali metal pentachlorophenate, for example, smaller than that desirable are charged into vessel 1 through line 24. By means of blower 13 air is blown through heater 6 to be heated and then discharged into vessel 1 beneath screen or perforated plate 10. The heated air is introduced into vessel 1 at a rate such that the particles added into vessel 1 will become fluidized. Steam at superatmospheric pressure, being injected through nozzle 31, atomizes the aqueous alkali metal pentachlorophenate solution being added to the nozzle and creates a zone of dilute fluidization in the vicinity of the nozzle outlet. Particles in the fluidized bed passing through the dilute fluidization zone become coated with the solution in the portion of the atmosphere having a high steam content. The water is evaporated from the particles after they leave the zone of dilute fluidization.

A portion of the alkali metal pentachlorophenate is continually withdrawn from the fluidized bed through pipe 18 and elevated by means of elevator 3 to screen 4 where the product is separated according to size. Particles which are larger than the desired size are discharged through line 19 to a grinder 5 where they are ground and returned to the bed through line 24. The desired product taken off is discharged through line 21 and placed in storage or packaged as desired. The undersize particles leaving the bottom of the screen are discharged through line 22 into line 24 to be returned to the fluidized bed. The air used in drying and fluidizing the bed is discharged from vessel 1 through pipe 16 through a dust collecting apparatus such as cyclone 2 as shown. The fine particles recovered in the cyclone 2 are likewise discharged into line 24 and returned to the bed. The fine particles recovered by the dust collection equipment, the undersized product from the screen assembly, and the grinding output, are injected into the bed through line 24 by use of a carrying fluid such as air. These fines are injected into the bed near the center of the bed and below the zones of dilute fluidization created by the injection of the steam.

To obtain the desired solid particles of the material it is essential that the aqueous solution be injected in the dilute fluidization zone created by the steam. The theoretical explanation for this is not definitely known but it can be speculated that in coating the particles in an atmosphere containing a high content of steam the particle surface is conditioned so that a good adhesion is obtained upon drying or evaporating the water from the solution coating the particles. While the solution and the steam may be injected separately, it is most convenient generally to use a bifluid nozzle and utilize a portion of the steam pressure to atomize the solution.

The term "dilute fluidization" is used herein under its accepted meaning to define dilute phase fluidization wherein the voids between the particles are very large and the particles are entrained in the fluid medium. This phase is usually separated from the dense phase fluidization or the normal fluidization phase by a slugging phase.

The dilute fluidization zones created by the steam must be entirely within the fluidized bed or entirely within the dense fluidization phase of the bed. The zone is thus encompassed by particles in a dense fluidization phase. The zone must be transverse to the flow of the fluidizing air. It may be very conveniently obtained by injecting steam from the outer periphery of the bed. A single zone or a multiplicity of zones may thus be created by injecting steam from numerous points from around the outer periphery of the bed. When a multiplicity of such zones are used within the bed, it is essential that the dilute fluidization zones do not intersect or overlap. Generally the zones created do not extend beyond 1/3 the distance across the cross-sectional area of the bed.

As pointed out above the zones of dilute fluidization and the introduction of solution may be obtained simultaneously by use of a bifluid nozzle. For example, in the preparation of sodium pentachlorophenate having a particle size in the range of 4 to 100 mesh, a bifluid nozzle may be used using steam at pressures in the range of 35 to 85 pounds per square inch. A weight ratio of steam to solution is generally maintained in the range of 0.05 to 0.60, preferably in the range of 0.1 to 0.25. Generally at the lower rates of solution injection lower steam pressures may be used. In operating it is generally preferred to have a zone of dilute phase fluidization within the bed which extends from about 12 to 24 inches within the bed. A divergent nozzle is generally used so that the zone created within the bed has a diameter which is from about 1/8 to 1/3 the length of the zone. When the dilute fluidization zones are too large, a sufficient number of particles does not pass through the zone resulting in excessive dust formation. Generally the zones of dilute phase fluidization are maintained such that the total influence of the zones or the dilute phase fluidization is in the range of from 5 to 12 percent of the total volume of the fluidization bed.

The solution injected into the zone of dilute fluidization is generally relatively saturated so that less water would have to be vaporized. For example for sodium pentachlorophenate, a solution containing from 25 to 32 weight percent is usually used. The air used for fluidization is preheated to a temperature to maintain the bed below the decomposition temperature of the product being handled and the amount of air is adjusted to give the desired fluidization. It is apparent that the amount of solution introduced must be such that the air being used is sufficient to dry the product.

The fine particles of the desired material being introduced into the bed to be built up must be introduced at a point below the dilute fluidization zones. Generally a carrying fluid is desriable so that the fine particles are immediately distributed and not segregated within the bed. It is preferred to inject the small size particles near the bottom of the fluidized bed or just above the screen transversely to the fluidized air flow and downwardly. The discharge should be positioned so that it does not discharge into zones of dilute fluidization.

The above process is especially applicable to the preparation of an alkali metal pentachlorophenate. The product produced resists attrition and does not sublime and recrystallize to form dust particles upon storage. However, it is apparent that the process may be used for the preparation of other materials from aqueous solutions. Illustrative examples of other materials which may be so prepared are the alkali and alkaline earth metal chlorides as sodium or calcium chloride, alkali and alkaline earth metal silicates, and inorganic salts of organic materials such as detergents as the alkali metal sulfonates of alkylated diphenyl oxide. The products obtained are generally in a high density, spherical shaped particle form.

To further illustrate the invention, an apparatus similar to that shown in the attached drawing was assembled and sodium pentachlorophenate having a 18 to 40 Tyler mesh particles size was prepared. The fluidized bed was 8 feet in diameter and fluidizing air heated to about 220° C. was used. The superficial velocity within the bed was varied in the range of 2.7 to 3.1 feet per second. Numerous runs were made where the height of the bed was varied from around 12 to 30 inches. Around the outer periphery of the bed, six bifluid nozzles were uniformly positioned so that the distance of the nozzle above the grid or screen was from 0.2 to 0.4 times the height of the bed. The nozzles were positioned to discharge directly into the bed. The undersized particles were injected into the bed by use of air at a point near the center and just above the screen.

The portion continuously withdrawn from the bed had the following analysis:

| Tyler screen mesh | Weight percent on screen | Accumulative percent |
|---|---|---|
| 14 | 12 | 12 |
| 18 | 16 | 28 |
| 25 | 19 | 47 |
| 30 | 16 | 63 |
| 35 | 20 | 83 |
| 40 | 8 | 91 |
| 45 | 4 | 95 |
| 50 | 3 | 98 |
| 70 | 1 | 99 |
| 100 | 1 | 100 |
| Thru 100 | trace | |

After screening a product of about 63 percent of the fraction was obtained which had a size range between 18 and 40 Tyler mesh.

The particles which passed through the 40 mesh screen were returned to the bed, while the particles which were retained on the 18 mesh screen and larger were passed through the grinder. The product from the grinder had the following screen analysis:

| Tyler screen mesh | Weight percent on screen | Accumulative percent |
| --- | --- | --- |
| 14 | 6 | 6 |
| 18 | 11 | 17 |
| 25 | 14 | 31 |
| 30 | 12 | 43 |
| 35 | 18 | 61 |
| 40 | 11 | 72 |
| 45 | 6 | 78 |
| 50 | 6 | 84 |
| 70 | 7 | 91 |
| 100 | 4 | 95 |
| Thru 100 | 5 | 100 |

The fines from the cyclone amount to about approximately 3 percent by weight of the portion being withdrawn continually from the bed. Thus on the basis of 100 pounds of material being continually withdrawn from the bed, 63 pounds of product, 28 pounds of oversize, and 9 pounds of undersize were obtained. The 9 pounds of undersize particles, the 28 pounds of oversize after grinding and about 3 pounds of fines from the cyclone were returned to the bed to be built up.

In the operation a steam pressure of 40 to 45 pounds per square inch was used to inject an approximately 32 percent solution of sodium pentachlorophenate at a rate of about 10 pounds per hour per square foot of the fluidized bed. At this steam pressure it was estimated that the zones of dilute fluidization obtained at each of the nozzles was approximately 15 inches in length and 5 inches in diameter. The bed temperature was about 110° C.

In the manner described above the run was repeated except that the steam pressure was varied from 35 to 50 pounds per square inch and a satisfactory product was still obtained. Above 50 pounds dusting was obtained. When the rate of solution injected, however, was increased to 20 pounds per hour per square foot, the optimum steam pressure to obtain the desired dilute zone was in the range of 55 to 65 pounds per square inch. Pressures up to 85 pounds produced a satisfactory product without excessive dusting.

The location and the height of the nozzle above the screen in the bed was varied and it was found that a satisfactory product could be produced as long as the distance above the screen was such that the dilute zone of fluidization did not contact the screen or extend outside of the bed at the top.

In a manner similar to that described above, calcium chloride and sodium sulfonate of alkylated diphenyl oxide were prepared in a spherical shaped, high density particle form.

What is claimed is:

1. A continuous process for the preparation of a solid material in a pelletized solid form of from 4 to 100 Tyler mesh size, from an aqueous solution of the material, which comprises passing heated air at a temperature below the decomposition temperature of the material up through a confined zone of a particular cross-sectional area containing the material in particles having an average size in the range of from 4 to 100 Tyler mesh at a flow rate sufficient to form thereof a fluidized bed; continuously injecting steam into the bed from the outer periphery of the bed from at least one point transversely to the upward flow of the said heated air at a pressure sufficient to obtain a zone of dilute phase fluidization within the so-fluidized bed from each point of injection extending to not more than 1/3 the distance across the fluidized bed, each of said dilute phase fluidization zones being separate and non-overlapping and entirely within the fluidized bed; spraying into the dilute fluidized zone an aqueous solution of the material in an amount such that the water in the solution is vaporized by the said heated air, thereby coating said pelletized solid material with said aqueous solution therein; injecting by means of a carrying fluid particles of said solid material of a size smaller than the average size of the particles present in the fluidized bed, said fine particles being injected downwardly and transversely to said heated air flow in said bed at a point below the dilute phase fluidization zones formed by the injection of the steam; and continuously discharging a portion of the material from the bed.

2. A process according to claim 1 wherein the material is sodium pentachlorophenate.

3. A continuous process for the preparation of sodium pentachlorophenate in a pelletized solid form of from 4 to 100 Tyler mesh size, which comprises passing heated air at a temperature below the decomposition temperature of sodium pentachlorophenate up through a confined zone of a particular cross-sectional area containing sodium pentachlorophenate in particles having an average size in the range of from 4 to 100 Tyler mesh at a flow rate sufficient to form thereof a fluidized bed; continuously injecting steam into the bed transversely to the upward flow of the said heated air in the so-fluidized bed, said steam being injected into the bed from the outer periphery of the bed from at least one point at a superatmospheric pressure sufficient to obtain a non-overlapping zone of dilute phase fluidization within the bed from each point of injection extending no more than 1/3 the distance across the fluidized bed; each of said dilute phase fluidization zones being separate and non-overlapping and entirely within the fluidized bed; spraying into the dilute fluidized zone an aqueous solution of sodium pentachlorophenate in an amount such that the water is vaporized by the heated air, thereby coating sodium pentachlorophenate particles with aqueous sodium pentachlorophenate solution therein; injecting by means of a carrying fluid particles of sodium pentachlorophenate of a size smaller than the average size of the particles present in the fluidized bed, said fine particles being injected downwardly and transversely to said heated air flow in said bed at a point below the dilute phase fluidization zones formed by the injection of the steam; and continuously discharging a portion of the pentachlorophenate from the bed.

4. A process according to claim 3 wherein the sodium pentachlorophenate solution is substantially saturated.

5. A continuous process for the preparation of sodium pentachlorophenate in a pelletized solid form of from 4 to 100 Tyler mesh size, which comprises passing heated air at a temperature below the decomposition temperature of sodium pentachlorophenate up through a confined zone of a particular cross-sectional area containing sodium pentachlorophenate having an average size in the range of from 4 to 100 Tyler mesh at a flow rate sufficient to form thereof a fluidized bed; continuously injecting steam into the bed transversely to the upward flow of said heat in the bed, said steam being injected into the bed from the outer periphery of the so-fluidized bed from at least one point at a pressure of from 35 to 85 pounds per square inch to obtain a non-overlapping zone of dilute phase fluidization, extending to not more than 1/3 the distance across the fluidized bed, within the bed from each point of injection, each of said dilute phase fluidization zones being separate and non-overlapping and entirely within the fluidized bed; spraying into the dilute fluidized zone a substantially saturated aqueous solution of sodium pentachlorophenate in an amount such that the water is vaporized by the heated air, thereby coating sodium pentachlorophenate particles with aqueous sodium pentachlorophenate solution therein; injecting by means of air particles of sodium pentachlorophenate of a size smaller than the average size of the particles present in the fluidized bed, said fine particles being injected downwardly and transversely to said heated air flow in said bed at a point below the dilute fluidization zones formed by the injection of the steam; and continuously discharging a portion of the pentachlorophenate from the bed.

6. A continuous process for the preparation of sodium pentachlorophenate in a pelletized solid form of from 4 to 100 Tyler mesh size, which comprises passing heated air at a temperature below the decomposition temperature of sodium pentachlorophenate up through a confined zone of a particular cross-sectional area containing sodium pentachlorophenate having an average size in the range of from 4 to 100 Tyler mesh at a flow rate sufficient to form thereof a fluidized bed; discharging the air passed through the bed through a dust collector to remove the fine solid particles entrained in the air stream; continuously injecting steam into the bed transversely to the upward flow of said heat in the bed, said steam being injected into the bed from the outer periphery of the so-fluidized bed from at least one point at a pressure of from 35 to 85 pounds per square inch to obtain a non-overlapping zone of dilute phase fluidization, extending to not more than 1/3 the distance across the fluidized bed, within the bed from each point of injection, each of said dilute phase fluidization zones being separate and non-overlapping and entirely within the fluidized bed; spraying into the dilute fluidized zone a substantially saturated aqueous solution of sodium pentachlorophenate in an amount such that the water is vaporized by the heated air, thereby coating sodium pentachlorophenate particles with aqueous sodium pentachlorophenate solution therein; continuously discharging a portion of the pentachlorophenate from the bed; screening the portion of the sodium pentachlorophenate discharged from the bed to thereby obtain a fraction of the sodium pentachlorophenate in the desired particle size distribution, a fraction of oversize particles, and a fraction of undersize particles; grinding the oversize particles to reduce the size of the oversize particles to a size smaller than the average size of the particles in the fluidized bed; and continuously injecting into the bed by means of air the undersize particles of sodium pentachlorophenate obtained from the screen, the ground fraction of the sodium pentachlorophenate, and the fine particles removed from the air stream by the dust collector, said particles being injected into the bed downwardly and transversely to said heated air flow in the bed at a point below the dilute fluidization zones formed by the injection of the steam.

References Cited in the file of this patent

UNITED STATES PATENTS

| | | |
|---|---|---|
| 2,561,394 | Marshall | July 24, 1951 |
| 2,648,609 | Wurster | Aug. 11, 1953 |
| 2,906,608 | Jequier et al. | Sept. 29, 1959 |
| 2,986,475 | Mesnard et al. | May 30, 1961 |
| 3,001,228 | Nack | Sept. 26, 1961 |
| 3,036,338 | Nack | May 29, 1962 |
| 3,117,020 | Fabris et al. | Jan. 7, 1964 |